United States Patent [19]

Maiocco

[11] 4,397,167

[45] Aug. 9, 1983

[54] ANTITHEFT DEVICE FOR MOTOR VEHICLES

[75] Inventor: Guiseppe Maiocco, Rivoli, Italy

[73] Assignee: Arman S.p.A., Druento, Italy

[21] Appl. No.: 151,959

[22] Filed: May 21, 1980

[30] Foreign Application Priority Data

Jun. 20, 1979 [IT] Italy .................. 68314 A/79

[51] Int. Cl.³ .............. B60R 25/02; E05B 9/04; E05B 9/06; E05B 29/00
[52] U.S. Cl. ...................... 70/370; 70/252; 70/451
[58] Field of Search ............. 70/370, 368, 369, 367, 70/451, 252, 449, DIG. 39, 371, 184–186, 224; 403/328, 329, 327, 324, 326; 285/319, DIG. 22

[56] References Cited

U.S. PATENT DOCUMENTS

| | | | |
|---|---|---|---|
| 1,396,508 | 11/1921 | Dunn | 70/185 |
| 2,039,244 | 4/1936 | Lowe | 70/46 |
| 2,103,987 | 12/1937 | Kistner | 70/451 |
| 2,221,082 | 11/1940 | Fitzgerald | 70/252 |
| 2,292,515 | 8/1942 | George | 70/371 X |
| 3,442,102 | 12/1966 | Butts | 70/1.5 |
| 3,569,930 | 3/1971 | Hirama | 340/63 |
| 3,590,611 | 7/1971 | Nakashima | 70/252 X |
| 3,686,906 | 8/1972 | Watkins et al. | 70/252 |
| 3,752,514 | 8/1973 | Schoeps | 403/328 X |
| 3,753,361 | 8/1973 | Schiesterl | 70/371 X |
| 3,789,636 | 2/1974 | Nakashima | 70/252 |
| 3,840,714 | 10/1974 | Arman | 70/252 X |
| 3,919,867 | 11/1975 | Lipschutz et al. | 70/186 |
| 4,222,253 | 9/1980 | Peitsmeier | 70/368 X |

FOREIGN PATENT DOCUMENTS

| | | | |
|---|---|---|---|
| 73508 | 8/1944 | Czechoslovakia | 70/186 |
| 1808633 | 6/1970 | Fed. Rep. of Germany | 70/370 |
| 2053775 | 5/1972 | Fed. Rep. of Germany | 70/252 |
| 2821675 | 11/1979 | Fed. Rep. of Germany | 70/252 |

*Primary Examiner*—Cornelius J. Husar
*Assistant Examiner*—C. F. Pietruszka
*Attorney, Agent, or Firm*—John C. Purdue

[57] ABSTRACT

An antitheft device for the steering shaft of a motor vehicle is provided and has a resiliently urged locking or keying member (30) carried by an inner, non-rotatable tubular body (12). The locking or keying member (30) is deflected (32) in one direction to permit assembly of the inner tubular body (12) in an outer housing (10) of the device. The locking or keying member (30) is resiliently urged (32) into seating relationship in a radial opening (26) in the housing (10) when the inner tubular body (12) is in proper position in the housing (10). The locking or keying member (30) is deflected (32) in another direction to permit assembly of a cylinder lock (14) in said tubular body (12). The locking or keying member (30) is resiliently urged (32) into seating relationship in an aligned radial opening (28) in the cylinder lock (14) when the cylinder lock (14) is properly positioned in said inner tubular body (12). A peripheral groove (52) in the cylinder lock (14) is aligned with the locking or keying member (30) to permit deflection of the locking or keying member (30) so that the outer housing (10) can be removed from the inner tubular body (12).

6 Claims, 2 Drawing Figures

ANTITHEFT DEVICE FOR MOTOR VEHICLES

DESCRIPTION

1. Technical Field

The present invention relates to antitheft devices for locking the steering shaft of motor vehicles and, more particularly, to an apparatus for keying the respective parts of an antitheft device together.

2. Background Art

In antitheft devices having an outer substantially cylindrical housing, an inner tubular body positioned inside the outer housing and a cylinder lock located inside the inner tubular body, there is a problem, when assembling the parts, in being able to axially lock the inner tubular body to the outer housing on the one hand and the cylinder lock to the inner tubular body on the other hand.

The present invention is directed to overcoming one or more of the problems as set forth above.

DISCLOSURE OF INVENTION

The object of the present invention is to solve this problem in a simple, functional and economical manner with a reduced number of parts.

The invention thus relates more particularly to an antitheft device for locking the steering shaft of motor vehicles of the above specified type, which is characterized by the fact that it comprises an elastic locking member carried by the inner tubular body and capable, when the device is assembled, of snap-locking the inner tubular body with respect to the outer housing on the one hand and the cylinder lock with respect to the inner tubular body on the other hand.

Because of said snap-locking feature, the axial locking of the inner tubular body with respect to the outer housing as well as of the cylinder lock with respect to the inner tubular body is obtained by simply inserting respectively the inner tubular body into the outer housing and the cylinder lock into the inner tubular body, without any additional and/or subsequent operations.

It is to be noted that the cylinder lock of the known antitheft devices always comprises an inner rotating cylinder and an outer stationary cylinder.

According to the invention, the inner tubular body is provided with a first radial opening, in which is slidingly mounted an elongated key, the length of which being larger than the length of said radial opening and said key being subject to the action of an elastic spring means which tends to maintain it in a central position, in which the two end portions of the key are inserted—when the device is assembled—in two radial openings in line with said first radial opening, said two radial openings being respectively located in the outer housing and in the stationary cylinder of the lock, the radial displacement of the key in both directions with respect to said central position being resiliently opposed by the elastic spring means and the two end portions of said key being shaped so as to cause, when the inner tubular body is inserted into the outer housing, the snapping of the outer end portion of the key into said radial opening of the outer housing and, when the cylinder lock is subsequently inserted into the inner tubular body, the snapping of the inner end portion of the key into said radial opening of the stationary cylinder of the lock.

According to another feature of the invention, the rotating cylinder of the lock is provided with a peripheral vertical groove which, in one predetermined angular position of said rotating cylinder, comes in line with said radial opening of the stationary cylinder, so as to allow an inwardly directed radial displacement of the key under the action of an outer force which is applied in such a manner that the outer end of the key is disengaged from the radial opening of the outer housing.

According to the invention, said elastic spring means consists of an elastic blade secured at one of its end portions to the inner tubular body and engaged, at its other end, in a notch of the key, said elastic blade extending, in its undeformed state, in a plane which is parallel to the axis of the outer cylindrical housing and perpendicular to the direction of displacement of the key.

BEST MODE FOR CARRYING OUT THE INVENTION

Figure 1:
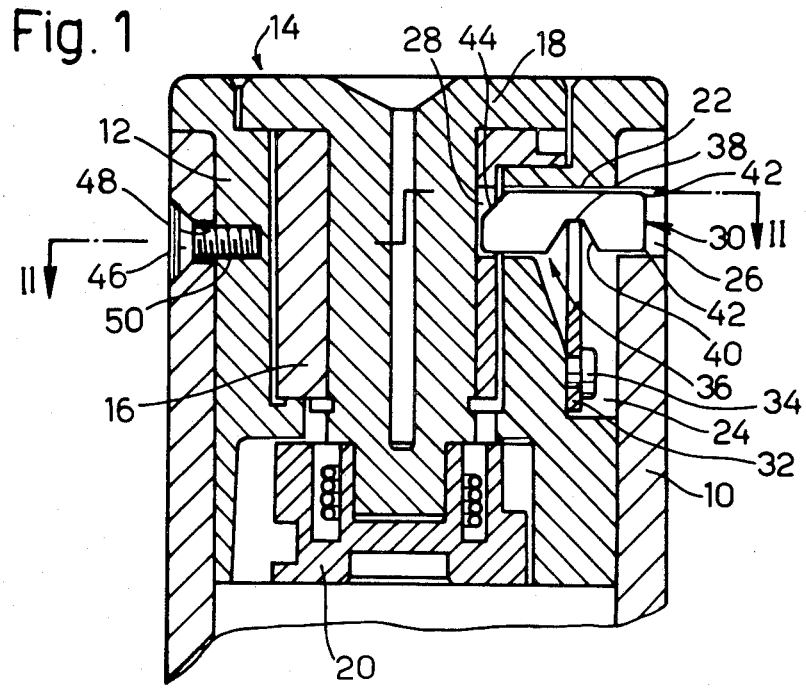
FIG. 1 is a view, partially in longitudinal section, of the antitheft device according to the invention.
Figure 2:
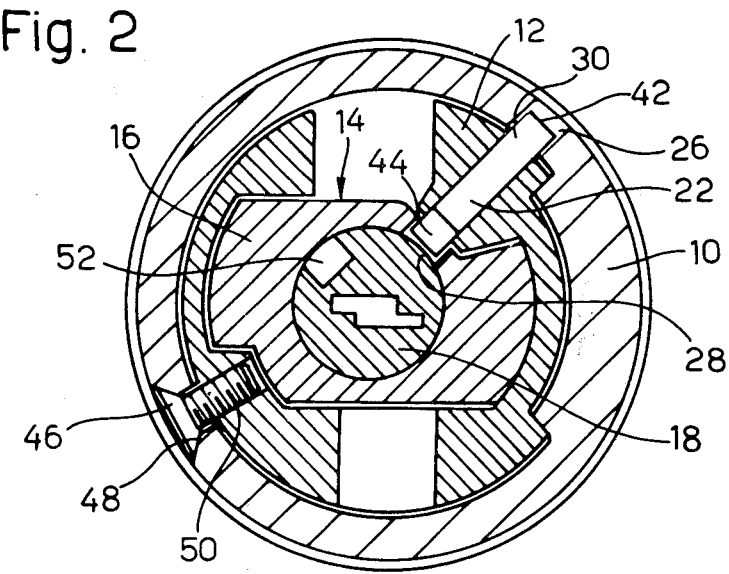
FIG. 2 is a cross-section along the line II—II of FIG. 1.

Referring now to the drawings, the antitheft device according to the invention comprises an outer cylindrical housing 10, an inner tubular body 12 inserted in the outer housing 10 and a cylinder lock 14 inserted in the inner tubular body 12. The cylinder lock 14 comprises, in a manner known per se, a fixed cylinder 16 and a rotating cylinder 18 which is connected, in a manner known per se, to the rotor 20 cooperating with a latch (not shown) capable of preventing the rotation of the steering shaft of a motor vehicle.

The inner tubular body 12 has a radial opening 22 which opens outwardly in a peripheral groove 24 facing the inner side wall of the cylindrical housing 10. The radial opening 22 is in line with a radial opening 26 provided in the cylindrical housing 10 and with a radial opening 28 provided in the stationary cylinder 16 of the lock 14.

Reference numeral 30 designates the key slidingly mounted in the radial opening 22 of the inner tubular body 12 and acting as a locking member so as to axially lock the inner tubular body 12 with respect to the cylindrical housing 10 and/or to the fixed cylinder 16 of the cylinder lock 14 with respect to said inner tubular body 12. The key 30 has a length which exceeds the length of the radial opening 22 and is engaged, with its outer and inner end portions, in its central position shown on the drawing, respectively in the radial opening 26 of the cylindrical housing 10 and in the radial opening 28 of the stationary cylinder 16. The key 30 is maintained in this central position by an elastic or resilient blade 32 located in the groove 24 of the inner tubular body 12 and extending, in its undeformed position, in a plane which is parallel to the axis of the inner tubular body 12 and perpendicular to the direction of the sliding movement of the key 30. Said elastic or resilient blade 32 is secured, at one of its end portions, to the inner tubular body 12, for example by means of a rivet 34, and is engaged, at its free end, in a notch 36 in the key 30. Said notch 36 is defined by a bottom wall 38 having a width which is substantially equal to the thickness of the elastic or resilient blade, and by two outwardly flaring side walls 40.

When the device is being assembled, the key 30 executes a double snapping movement, locking respectively the inner tubular body 12 to the outer cylindrical housing 10 and the cylinder lock 14 to the inner tubular body 12. In fact, during the assembly of the device, the inner tubular body 12 is first inserted into the outer housing 10. During this insertion, the key 30 is moved radially inwards with respect to its central position, against the action of the elastic blade 32, until the radial opening 22 of the inner tubular body 12 comes in line with the radial opening 26 of the housing 10. In this position, the elastic blade 32 urges the key 30 back into its central position because the outer end portion of said key 30 is moving into the opening 26. In order to facilitate the radial displacement of the key 30 in the outward direction or the subsequent return of said key 30 in its central position, the outer end surface of the key 30 is provided with rounded corners 42.

The subsequent operation is the insertion of the cylinder lock 14 into the inner tubular body 12. During this insertion, the key 30 is radially moved outwards against the action of the elastic blade 32 and is maintained in this position until the opening 28 of the stationary cylinder 16 comes in line with the opening 22 of the inner tubular body 12. In this position, the elastic blade 32 urges the key 30 back into its central position because the inner end portion of the key 30 is moving into the opening 28 of the stationary cylinder 16. In order to facilitate this operation, the inner end surface of the key 30 is provided with a tapered or rounded edge 44 acting as a slideway.

For ensuring an absolutely safe locking between the inner tubular body 12 and the outer housing 10, the device according to the invention may also be provided with a locking screw 46 which can be operated from the outside and may be inserted into two radially aligned holes 48,50 made respectively in the outer housing 10 and in the inner tubular body 12 in a substantially diametrically opposed position with respect to the key 30.

The rotating cylinder 18 of the lock 14 has a vertical peripheral groove 52 which, in a predetermined angular position of said rotating cylinder 18, comes in line with the radial opening 28 of the stationary cylinder 16. In said predetermined position of the rotating cylinder 18 and under the effect of a force from the outside, the peripheral groove 52 allows a radial inward displacement of the key 30 until a disengagement is caused between the outer end portion of said key and the radial opening 26 of the outer housing 10. In this way, the inner tubular body 12 may be smoothly pulled out of the outer housing 10, so as to allow the subsequent pulling out of cylinder lock 14 from said inner tubular body 12.

It is to be understood that the present invention is not limited to the exact construction shown and described, but that various changes and/or modifications may be made without departing from the spirit and scope of the invention as defined in the appended claims.

I claim:

1. An antitheft device for locking the steering shaft of a motor vehicle, comprising an outer cylindrical housing (10), an inner tubular body (12) positioned inside the outer housing (10), a cylinder lock (14) comprising an inner rotating cylinder (18) and an outer stationary cylinder (16) and located inside the inner tubular body (12) and a locking member (30) carried by the inner tubular body (12) and capable, when the device is being assembled, of locking the inner tubular body (12) with respect to the outer housing (10) on the one hand and the cylinder lock (14) with respect to the inner tubular body (12) on the other hand characterized in that said inner tubular body (12) is provided with a first radial opening (22), in which said locking member is slidingly mounted, said locking member comprising a key (30), the length of which is longer than the length of said radial opening (22), an elastic spring means (32) carried by said tubular body and engaging said key (30) to maintain said key in a central position, one end portion of said key (30) extending into one radial opening (26) in said cylindrical housing (10) and the other end portion of said key (30) extending into a radial opening (28) in said stationary cylinder (16), the radial displacement of the key (30) in either direction with respect to said central position being resiliently opposed by said elastic spring means (32).

2. A device according to claim 1, characterized in that the rotating cylinder (18) of the lock (14) is provided with a peripheral groove (52) which, in one predetermined angular position of said rotating cylinder (18), comes in line with said radial opening (28) of the stationary cylinder (16), so as to allow an inwardly directed radial displacement of the key (30) under the action of an outer force which is applied in such a manner that the outer end of the key (30) is disengaged from the radial opening (26) of the outer housing (10).

3. A device according to claim 1, characterized in that said elastic spring means (32) consists of an elastic blade (32) secured at one of its end portions to the inner tubular body (12) and engages at its other end, in a notch (36) of the key (30), said elastic blade (32) extending, in its undeformed state, in a plane which is parallel to the axis of the outer cylindrical housing (10) and perpendicular to the direction of displacement of the key (30).

4. A device according to claim 3, characterized in that said notch (36) of the key (30) is defined by a bottom wall (38) having a width which is substantially equal to the thickness of the elastic blade (32), and by two outwardly flaring side walls (40).

5. A device according to claim 1, characterized in that the surface of the outer end portion of the key (30) has rounded edges (42).

6. A device according to claim 1, characterized in that the surface of the inner end portion of the key (30) has a wide rounded edge (44).

* * * * *